April 24, 1928.
J. F. WAIT
1,667,465
FILTER AND FILTERING METHOD
Filed March 10, 1925      5 Sheets-Sheet 2
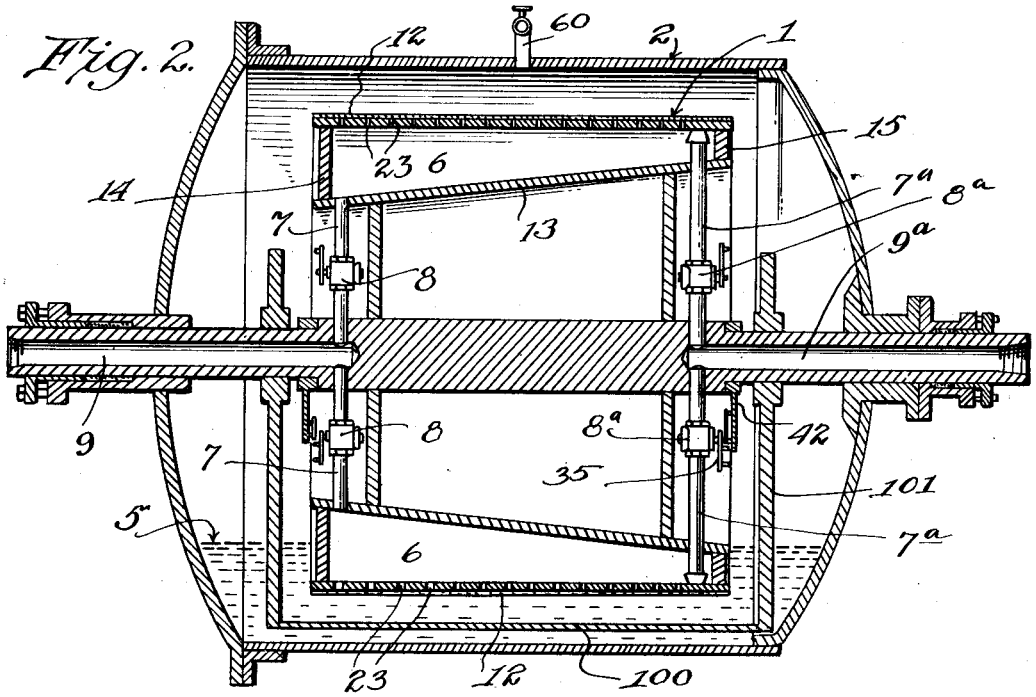
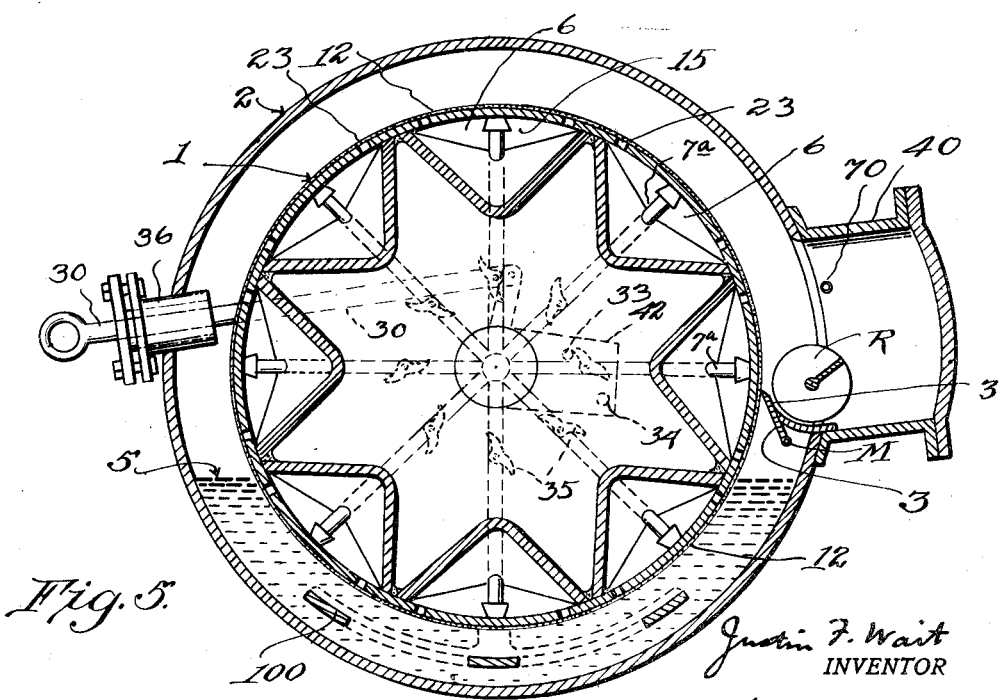

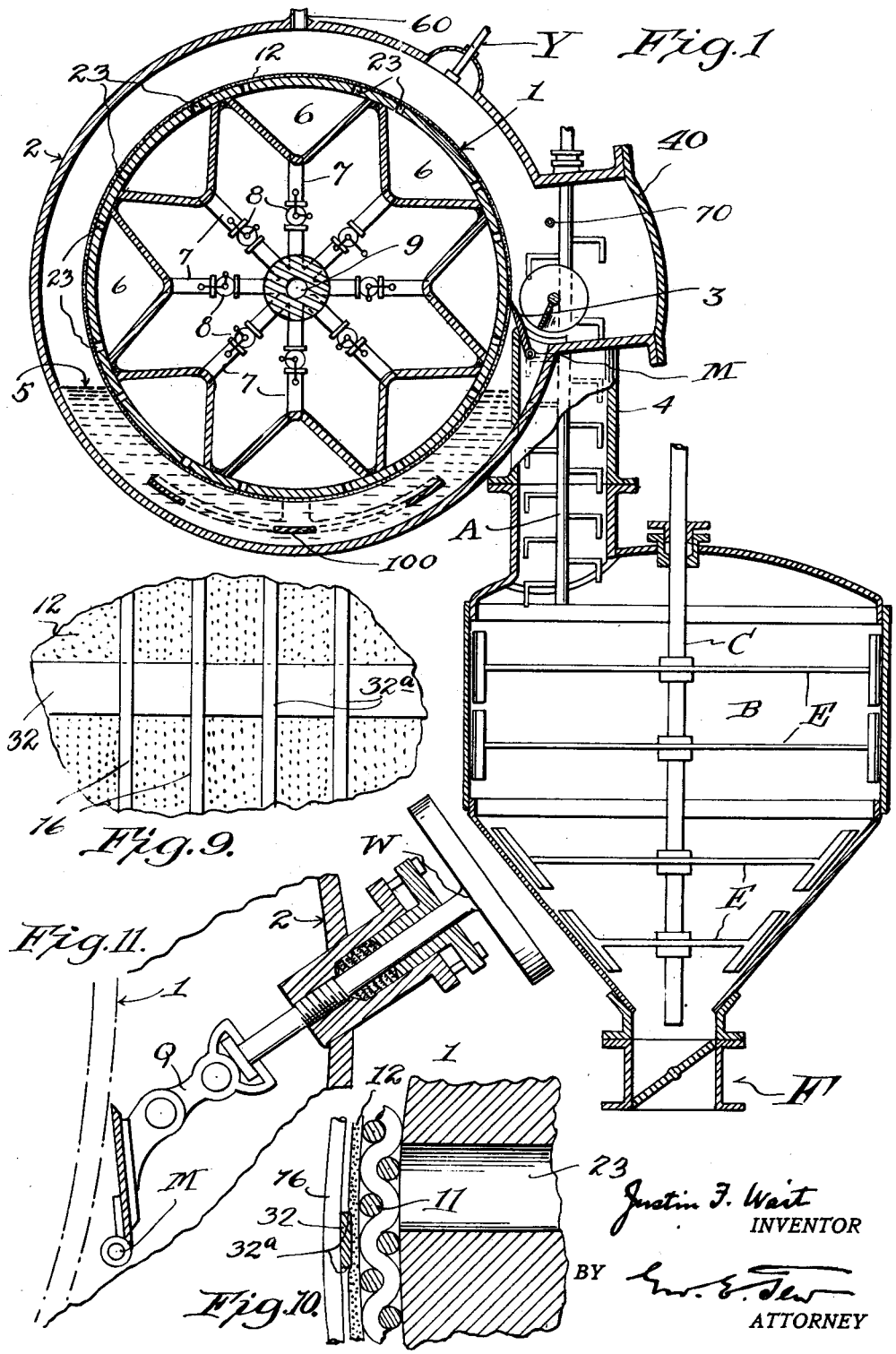

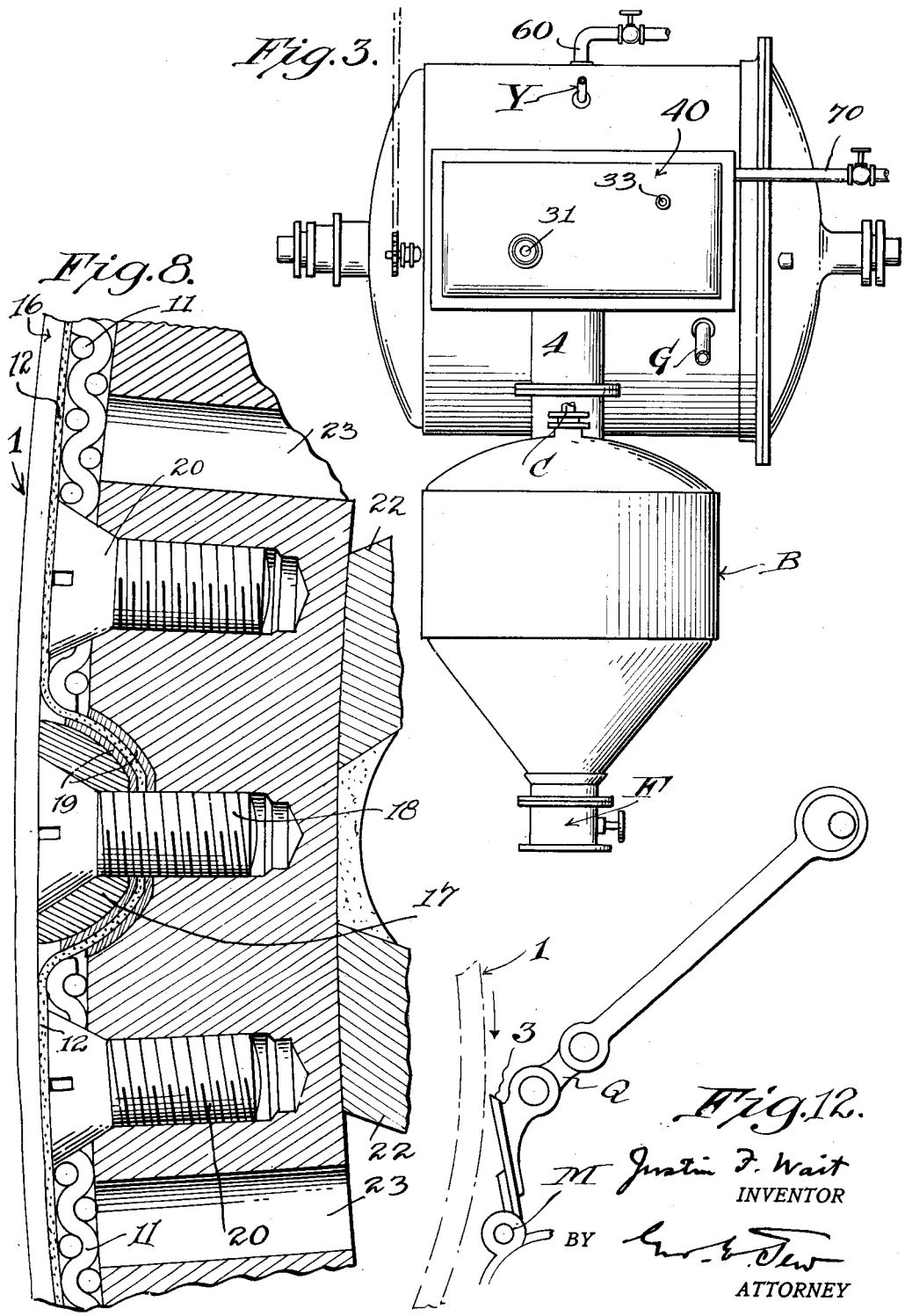

April 24, 1928.

J. F. WAIT 1,667,465

FILTER AND FILTERING METHOD

Filed March 10, 1925     5 Sheets-Sheet 4

Justin F. Wait
INVENTOR

BY
ATTORNEY

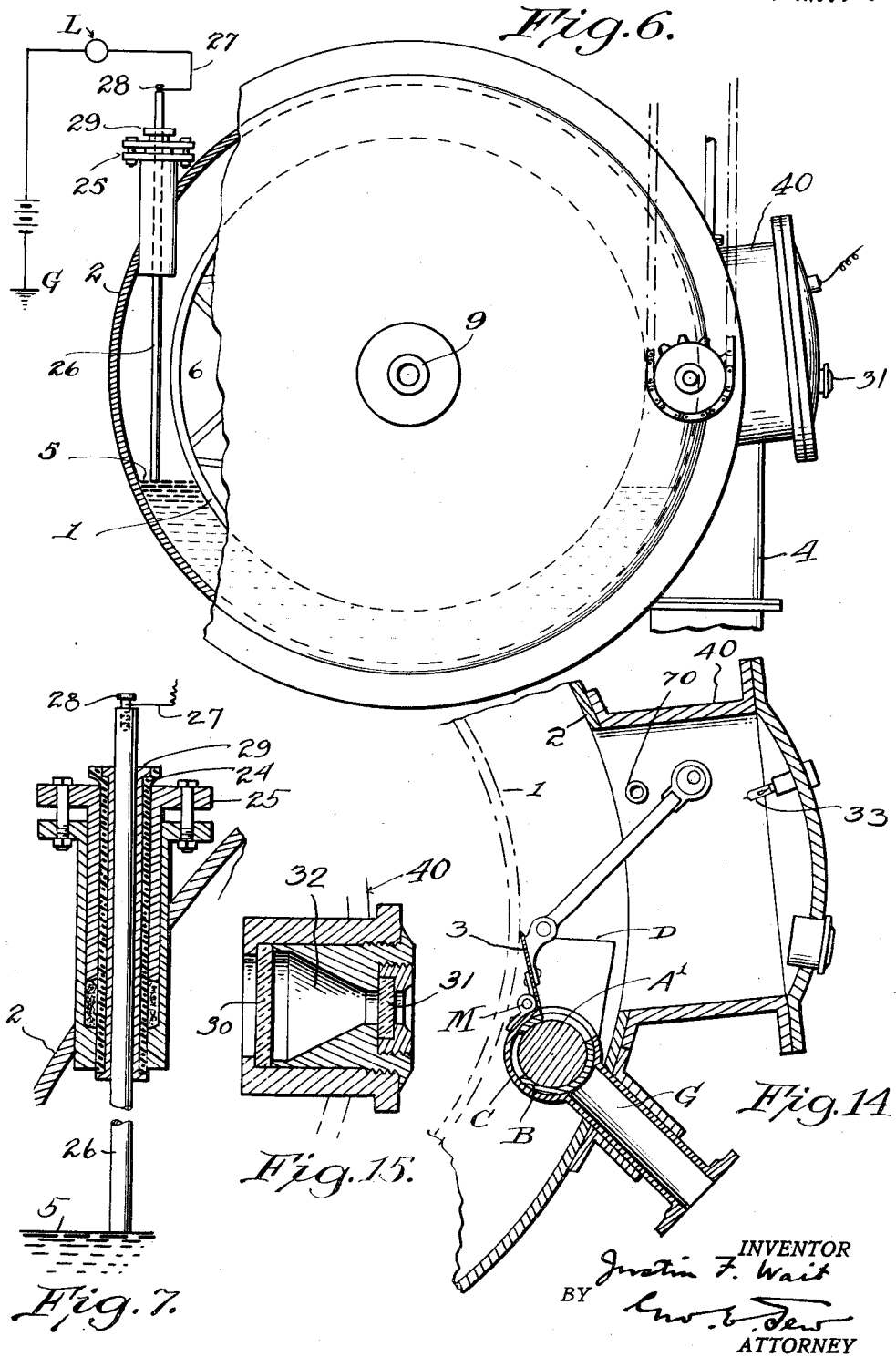

Patented Apr. 24, 1928.

1,667,465

UNITED STATES PATENT OFFICE.

JUSTIN F. WAIT, OF NEW YORK, N. Y.

FILTER AND FILTERING METHOD.

Application filed March 10, 1925. Serial No. 14,514.

This invention relates to improvements to methods of operation of filters and likewise includes improvements in the design of equipment suitable for industrial operation including filtration. This application includes features originally disclosed in my application filed February 2, 1920, which resulted in Patent No. 1,512,321, dated October 21, 1924, and my application filed December 21, 1922, Serial No. 608,346.

The invention as disclosed herein includes specific operating methods for the economical production of a higher quality of filter cake than has heretofore been possible with operation by methods previously employed. Among these are means for separating portions of filter cake from other portions of lower quality and flow of fluids to and from filtrate receiver sections in an indirectional manner.

Detailed features of the invention relate to means for controlling the operation of closed filters for economic production of a filter cake at unusual rates or of unusual quality. By applying these means I have found it possible to successfully operate filters in a manner heretofore impossible. In particular, this invention has made possible the application of the enclosed continuous rotary drum filter.

Figure 4:
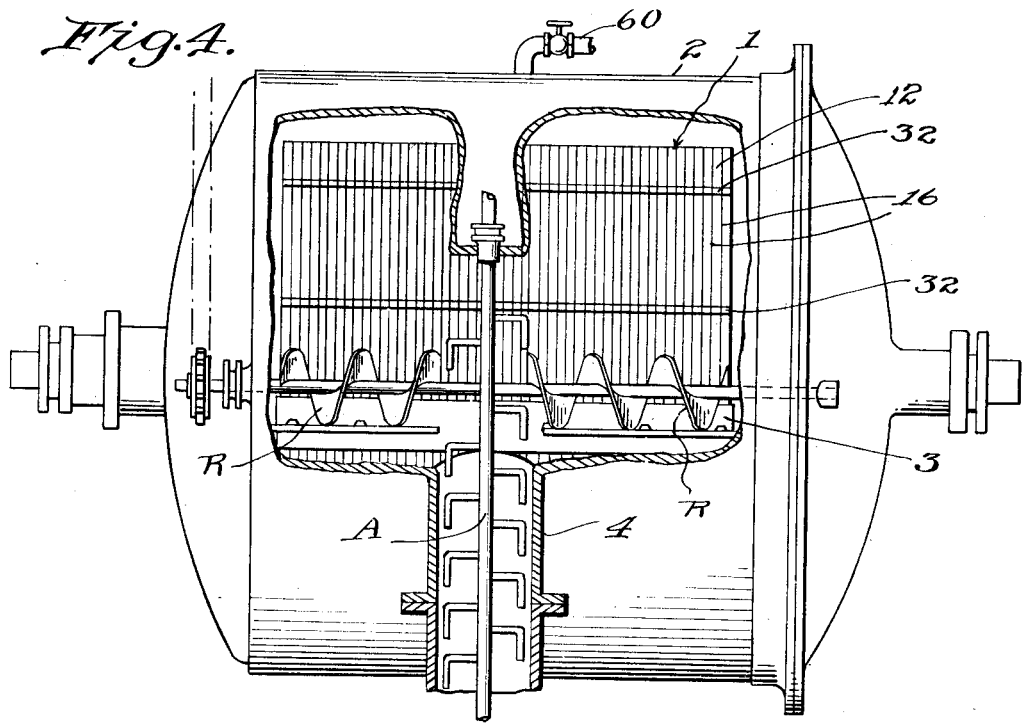
Figure 13:
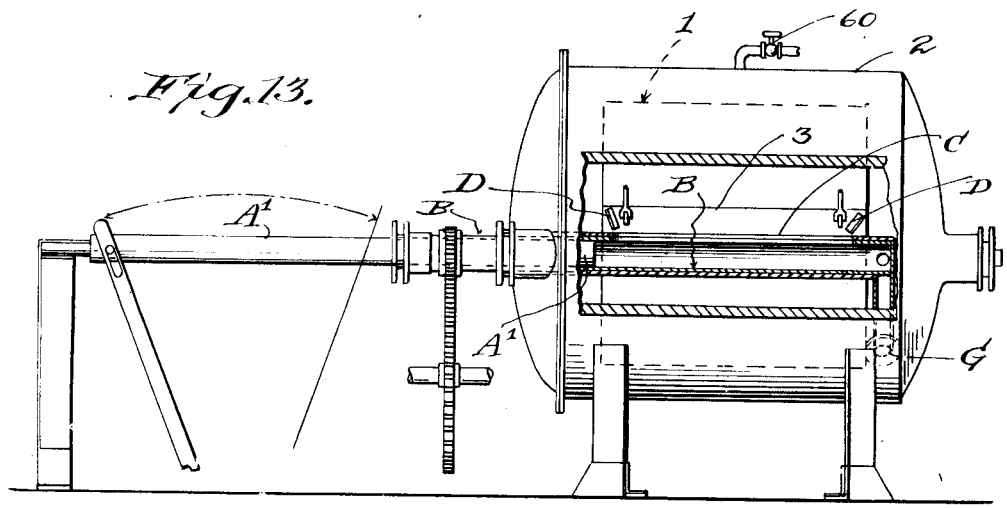

In the accompanying drawings, Fig. 1 is a vertical cross section of one form of the apparatus. Fig. 2 is a central longitudinal section of the filtering drum. Fig. 3 is a side elevation of the apparatus. Fig. 4 is a view showing the delivery mechanism in the filtering casing, part of the latter being broken. Fig. 5 is a cross section showing the means for controlling the distributing valves. Fig. 6 is a detail of the casing in section, with the electric devices for testing the level of the fluid, and Fig. 7 is an enlarged sectional detail of the latter. Fig. 8 is a detail in section showing one form of the means for fastening the filtering medium in place on the drum. Figs. 9 and 10 are similar details showing slightly different forms of the same. Figs. 11 and 12 are sectional details showing means for adjusting the scraper blades. Fig. 13 is a side elevation, partly in section, of a modified form of the discharge mechanism. Fig. 14 is an enlarged detail in cross section of the devices shown in Fig. 13. Fig. 15 is a detail in section of a slight glass.

The fundamentals involved may be understood by reference to Fig. 1 which shows a rotary pressure filter consisting of a closed shell 2, encasing a rotation drum 1, discharge knife 3 and discharge chute 4. The drum is shown as being divided into eight sections as 6. Discharge pipes 7 connect the sections 6 with the central discharge pipe 9. These discharge pipes may be multiplied in each section, for drums of great width.

The filter is operated by maintaining a level of liquor to be filtered as represented by 5. A super-atmospheric pressure of a gas or vapor is maintained within the shell 2 and above the liquor level. Such a pressure fluid may be introduced thru a valved pipe 60 tapped into the shell, and this pressure surrounds the drum. This fluid may be steam or other hot fluid to heat the material. Y is a spray pipe for washing fluids, as described in my said patent, from which washing liquid is sprayed onto the drum as it rotates. Application of this pressure results in filtration of the liquor thru the filtering medium carried by the drum 1. The pressure differential may be produced by suction on the pipe 9, and whereby the various features of this invention may likewise be effected. The combination of pressure and suction may likewise be used. As the drum rotates and each section immerses in the liquid, filtration ensues and the solid particles are retained by the filtering medium, the filtrate passing thru the pipes 7 and into the central discharge 9 by which it is delivered to the point desired.

A longitudinal view thru one of the sections is shown in Fig. 2. It consists of a section (preferably concave) and composed of the drum itself 1, a bottom plate 13 and end plates 14 and 15. Pipe 7 drains the section, the bottom plate being so shaped as to practically completely drain liquor from the section as it rotates, this feature being a marked improvement in filter means. The pipe 7ª is used to introduce the "blow" of cleansing or scrubbing medium such as air or steam.

Details of suitable methods of supporting the filtering medium and the method of constructing the drum are shown in Figs. 8, 9 and 10. Fig. 8 represents a section of the drum shell at the point of intersection of the drum walls of the two filter sections.

The drum is designated as 1 and the filtering medium carried thereon as 12. One of the features of the invention involves the use of a wire screen 11, or its equivalent, supported upon the drum 1 and best fastened by means of screws 20, affording drainage means for liquid from the medium 12 thru openings 23 in the drum 1 into the filter section 6 wherefrom it is discharged. This combination of a spacer and drainage means to conduct the filtrate into openings passing into the filter section affords satisfactory means for maintaining the desired shape of the filtering medium, especially when high pressures are involved.

A convenient and novel manner of making a liquid tight connection between two sections is shown by the strip 17 fastened by means such as screws 18 and extending across the face of the drum. In general, it is preferable to provide drainage by means of 11 up to a point close to strip 17 while running the medium 12 beneath strip 17, thus serving itself as a gasket if of suitable material, or with separate gaskets 19, if they are required. Strip 17 is forced against the drum, making a tight joint with the gasket.

Reinforcing wires or strips 16 are advantageous to support the medium 12. It is often desirable to use a perforated or woven metal screen instead of a wire to serve as a supporting means 16.

In securing the filtering medium to the filter drum, difficulty is frequently experienced by breakage of the wires around about the drum which were previously either not fastened at all between its ends or in an insecure manner. I devised a means as shown in Figs. 9 and 11 consisting of application of strips 32 preferably of thin flat metal and best inserted beneath the winding wire and at an angle thereto. In the figures, the filter support is represented by 1, the filter medium by 11, the winding wires by 16, and the strips by 32. They are preferably soldered or otherwise secured at all intersections as at 32ª.

The machine shown embodies a central outlet 9 for filtrate and a central inlet 9ª for a dislodging medium with separate valving mechanism for each section as shown by cocks 8 and 8ª. This feature of the invention is of special advantage with high pressure operation. The type of "distributing valves" commonly used in the art is for operation at some pressures. A type used with continuous pressure filters is of such a design that it will withstand high pressures and prevent appreciable leakage. Previous filter designs involve a single set of pipes, the filtrate is discharged therethru and a countercurrent flow of air as assistance for discharging is alternately blown back thru the same pipes. This dual use of the pipes usually causes an appreciable amount of filtrate to be discharged with the filter cake. This is emphasized if means for complete drainage of the section is lacking.

The actual independence of the filtrate and "blow" systems, in the present invention, permits of unlimited variation in control of the operation thereof, and the cocks or valves may be operated at any desired time frequency. The invention involves operation of these in a novel manner which produces filtration results heretofore unattainable. These operating methods are likewise applicable to other valving methods and operate satisfactorily therewith under some conditions.

I have found that a filter operating with some products and with no air blow gives a successive improvement in quality of both filtrate and filter cake. At the same time there is often a tendency for the filtration rate to fall off, this effect being very noticeable with some products. The economic method of operation is somewhere between the maximum rate obtained with initial operation as a clean fresh filtering medium dips in the liquid and the lower rate obtained after many successive dips of the same section. The quality of cake, on the other hand, is generally lower with the first dip and usually improves with successive dips.

My invention affords a means for approaching the economic method by including a means of operation which combines straight operation of the filter with intermittent "blow" or reversal of direction of flow thru the filtering medium which is intended primarily to clean the filtering medium. The specific method of operation involves a number of dips of a given section followed by a "blow" or countercurrent flow of a cleansing fluid thru the pipes 9ª and 7ª.

It is to be noted that previous methods of operation and design have in general provided for application of countercurrent flow to successive sections or portions of the filter which I have found entirely unnecessary and in fact often detrimental to quality of filter production. Best operation is obtained when countercurrent flow is avoided to as great an extent as possible, it being required only occasionally and then usually for cleaning the filter medium only. Some previous designs and methods involved actual use of the countercurrent flow to discharge the filter cake into the receiving hopper. This tends to produce impure filter cake and discharge therewith of wash and mother liquors. This is especially true when the countercurrent flow is created in the same pipe or tubing as is used for carrying away the filtrate which fault is emphasized in previous designs by lack of definite and complete drainage for a section.

The present filter may be operated so that a number of revolutions of the drum take place without "blow" and these are followed by one or more complete cycles of "blowing" to insure cleansing of each section. Another method of operation involves straight filtration of a number or group of successive sections with a "blow" application for the next section succeeding that group. For example, in an eight sectional unit, four successive sections would be operated without blowing, the fifth section with blow. This would cause a section to make four succeeding dips before being cleaned and produce a very dry or pure filter cake containing a minimum amount of liquid, especially if the "blow" occurs after a section has dropped below the scraper or discharge knife, which represents another unique and useful feature of this improved process.

Another novel feature of the invention permits of the collection of only the driest and purest portions of the filter cake. If a section of filter cake be carefully examined, it will be found that the outer portion is the most pure and most desired. The "nonblow" method of operation permits the cutting away and isolation of the purest portion of the cake and containing the least amount of wash or "mother liquor".

The improvement in quality of filter cake, as one selects successive samples radially outwardly from filtering medium, is quite marked. The outer portion is always most desired, the inward increments yielding a poorer quality of filter cake. In order to take fullest advantage of this fact, I have devised a means for definitely selecting the most choice sections and discharging them from the filter. This includes adjusting the position of the discharge knife or scraper so that any desired thickness of the cake may be removed and discharged from the filter. The amount of residual cake left after cutting away the desired thickness may be likewise controlled. This may be performed by scraping off a portion of the cake and using the valve blow system to discharge other portions below the knife and mixing same with the slurry to be filtered, by means of the swinging agitator 100 suspended by two arms 101 from the main shaft.

By operating thus, and blowing the cake completely from a section after the desired portion has been cut away, both a very high capacity and high quality of filter cake may be obtained notwithstanding the fact that some of the product may be discharged back into the filter and require refiltering.

The blow operation which removes the full depth of cake from the drum executed below the discharge knife. The portion of cake thus removed is mixed with the slurry and refiltered.

Satisfactory control of an enclosed rotary filter is insured by development of a mechanism for indicating the true depth of liquor (hence the drum submergence). This may be done by inserting an electrical conductor thru an insulating nozzle or fastener and holding the terminal at a level corresponding to that to be held. Such an outfit is shown in Fig. 6. A suitable potential is applied thereto to indicate whether the liquor is up to that level. Any form of indicator as a bell or an electric light can be used. An ordinary slurry usually has sufficient conductivity to indicate the level. If this is not the case, a small amount of electrolyte can be added to the slurry, or other special indication means can be employed.

The operation of an enclosed filter is greatly facilitated and rendered applicable to additional products by use of a special sight glass for observation of the interior of the filter casing. Illumination may be effected by means of an electric bulb 33. In particular this is desirable and almost essential when a warm vapor is used within the casing. In previous instances operation of the enclosed filter was carried out without observation of the filter cake discharged from the drum. I found that while an ordinary single glass or window might be used under some conditions, it usually permitted of condensation and blurring of the image and interfered with the operation, usually lowering the efficiency thereof.

My invention includes both the means for observation and the use of two glass members 30 and 31 (see Fig. 15) spaced so that they can be maintained at different temperatures. Glass 30 contacts with the interior of the casing and glass 31 with the exterior. By maintaining the former at approximately the same temperature as the interior of the filter the sight glass is maintained clear because of the chamber 32 between the two glasses and lack of vapor supply at higher temperature which would otherwise condense and render vision obscure.

The lamp and sight glasses are set in an extension 40 on the wall of the casing, above the liquor level.

With the rotary pressure type of filter or with the rotary vacuum filter operating with a vaporous atmosphere or on the recirculation process, this type of observation permits of precise control of the equipment, as the operator is able to at all times observe operating characteristics, including quality of filter cake and operation of the discharge means.

I have insured safe means for observation by introducing the special form of sight glass described above. This phase of the invention insures maximum protection of the observer and clear vision as condensation is eliminated by the dual glass with air or vapor chamber between. The higher strength due to use of a glass of small diameter is important especially from the viewpoint of safety. Without it, observation could not be made at such high pressure or at least not without appreciable hazard.

The means for discharge of products from an enclosed rotary filter at other than atmospheric pressure usually determines its adaptability to the filtration of a given product. I have found that there are three aids to positive discharge of such an enclosed rotary filter without which its operation is uncertain. They are a horizontal screw or its equivalent, an agitated vertical discharge and an agitated receiver or hopper, as previously described. The screw is designed to move the product to a point feeding the vertical discharge, the opening of which is kept open by a vertical agitator. The product passed by the screw drops thru the discharge into the hopper. The agitation in the hopper, which is provided with discharge valves, is desirable to facilitate discharge of the cake; and agitation may be used to uniformly dilute the cake either for resludging (possibly prior to refiltering) or merely to facilitate discharge of the cake by producing a less viscous filter cake.

Under some conditions the horizontal screw may be used for actually cutting the filter cake, eliminating the necessity for a scraper or knife. Other means may likewise be used. Solution of special problems is sometimes afforded by using the screw both as a conveyor and as a mixer. In this case, a liquid is added to the conveyor trough thru a pipe 70 in proper quantities to secure the desired consistency of mixture with filter cake. This, when applicable, frequently eliminates the necessity for the agitated hopper or receiver as discharge can be made direct from the conveyor trough thru suitable cock or throttle.

The discharge mechanism described above is shown in Fig. 4. The filter drum 1 rotates in shell 2. A scraper 3 discharges the filter cake into the trough of conveyors R—R. These carry the product towards the vertical discharge pipe 4 kept clean by stirrer A. The hopper B receives the product from 4 and is agitated by shaft C and members E. The final product is discharged thru valve F (Fig. 1).

Details of the mechanism for adjusting the scraper are shown in Figs. 11 and 12. The knife 3 which extends along the drum is hinged at its lower edge at M and moves towards or away from the surface of the filtering drum, to scrape or shave a predetermined thickness of material therefrom as the drum rotates. In Fig. 11, the blade is adjusted by a link Q and screw rod and wheel W. In the form shown in Fig. 12, the rod is adjusted by an eccentric.

For determining the liquor level the electric devices shown in Figs. 6 and 7 may be used. These comprise a conductor 26 extending thru the shell and insulated by a bushing 29 and wired to a source of current by binding post 28. The conductor rod 26 may be adjusted as to level or removed by loosening the stuffing box gland 25 which encloses the bushing which is preferably covered by a metal sheet 24. The circuit wire 27 includes a lamp L which will light when the electrode contacts the liquid in the shell.

For adjusting the control mechanism for valves 8 and 8ª, the device shown in Fig. 5 may be used. This includes a rod 30 adjustable thru a stuffing box 36 in the shell 2 and operable from outside the filter. The arm operates a plate 42 which can turn on the central shaft, and this plate carries pins 33 and 34 positioned to engage cams 35 on the valve stems so as to swing the valves to open or closed position. As the valves rotate with the drum, they are opened and closed in period between the pins, and by the means described the periodicity of action of the valves with respect to the rotary position of the drum can be varied by adjusting the rod 30.

Another method of discharge has been devised for handling pasty or somewhat fluid filter cake. It is shown in Figs. 13 and 14. It consists of an outer casing C designed to receive discharged product from an apron or guide D and surrounding an inner tube B which acts as a valve and piston guide and is operated to close openings thru which C receives the product. On closure of the opening in "C" the piston "A'" travels towards the right expelling the product thru the opening G. In many ways the action is similar to the action of a pump. After discharge, the piston is withdrawn as the valve "B" opens that "C" may receive another charge of product.

By pressure filtering is meant processes of filtering in which flow of liquid thru a membrane, cloth or other filtering medium is made positive by creating pressure on one side of that medium in excess of the pressure existing on the other side. In instances where operation is inferred as relating to pressures above atmospheric on one side of a medium equivalent results may usually be obtained by employing a subatmospheric pressure on the low pressure side of the medium.

I claim:

1. In filtering apparatus, the combination of a sectional drum adapted to rotation and carrying a filtering medium, a container for liquor to be filtered, a scraper to remove a portion of the filter bed deposited on the filter medium, means for maintaining a pressure differential causing penetration of the liquor thru portions of the filter medium, and means for causing counter current flow of a fluid in a reversed direction by a reversed pressure differential thru prescribed portions of the filter medium at a point in the cycle of rotation between the scraper and that where filtration again begins.

2. In pressure filtering, the method including filtering of the liquid thru a filtering medium and removal of cake therefrom without releasing the imposed pressure and wherein subsequent amounts of liquid are passed and subsequent quantities of filter cake removed and wherein after several such successive operations the pressure is released, and inflicting a pressure in the reverse direction and whereafter the normal pressure differential is again established, filtration resumed and an equivalent cycle repeated.

3. In pressure filtering, the method including removal of portions of the filter cake by suitable discharge means and subsequently removing a residual amount of the filter cake from the filter cloth, mixing the same with the slurry being filtered and subsequently refiltering the material.

4. The method of filtering involving removing substantially equal successive amounts of filter cake from a filtering medium while retaining thereon, by means of continued pressure differential, a portion of the filter cake closer to the filtering medium and subsequently removing such portion from the filtering medium by flow of a fluid thru the filtering medium and in a reverse direction to that of the liquid being filtered, said residual cake after such removal being subsequently mixed with the slurry and refiltered.

5. The method of discharging filter cake from a filtering medium including removal of portions of filter cake at a distance from the filter medium and discharging the same while residual portions of the cake are subsequently removed from the filtering medium and mixed with slurry to be later filtered.

6. In pressure filtration, the method including the formation of a filter cake, removal of a portion thereof, mixing of the remaining portion with the mass of material within the filter and subjecting the same to another step of filtration.

In testimony whereof, I affix my signature.

JUSTIN F. WAIT.